United States Patent
Thollot et al.

(10) Patent No.: US 7,586,703 B2
(45) Date of Patent: Sep. 8, 2009

(54) SEQUENTIAL COLOUR ILLUMINATION SYSTEM, METHOD FOR PRODUCING A COLOUR WHEEL FOR SAID SYSTEM AND A COLOUR SEGMENT DEVICE

(75) Inventors: Julien Thollot, Betton (FR); Arno Schubert, Chevaigne (FR)

(73) Assignee: Thomson Licensing, Boulogne Billancourt (FR)

(*) Notice: Subject to any disclaimer, the term of this patent is extended or adjusted under 35 U.S.C. 154(b) by 161 days.

(21) Appl. No.: 10/589,175

(22) PCT Filed: Feb. 11, 2005

(86) PCT No.: PCT/EP2005/050617
§ 371 (c)(1),
(2), (4) Date: Aug. 11, 2006

(87) PCT Pub. No.: WO2005/088985
PCT Pub. Date: Sep. 22, 2005

(65) Prior Publication Data
US 2007/0165317 A1     Jul. 19, 2007

(30) Foreign Application Priority Data
Feb. 12, 2004   (FR)   .................. 04 50254

(51) Int. Cl.
*G02B 5/22*   (2006.01)
*H04N 9/12*   (2006.01)
*G03B 21/14*  (2006.01)

(52) U.S. Cl. .............. 359/889; 359/891; 359/885; 348/743; 353/84

(58) Field of Classification Search .................. 359/891
See application file for complete search history.

(56) References Cited

U.S. PATENT DOCUMENTS

| 6,392,656 B1 | 5/2002 | Someya et al. |
| 2002/0024618 A1* | 2/2002 | Imai .................. 348/743 |
| 2002/0122019 A1 | 9/2002 | Baba et al. |

(Continued)

FOREIGN PATENT DOCUMENTS

JP   07318939 A   * 12/1995

(Continued)

OTHER PUBLICATIONS

Patent Abstracts of Japan, vol. 2003, No. 12, Dec. 5, 2003 & JP 2003-248462 (See Ref. AC).

(Continued)

*Primary Examiner*—Stephone B Allen
*Assistant Examiner*—Jade R Callaway
(74) *Attorney, Agent, or Firm*—Robert D. Shedd; Harvey D. Fried; Richard LaPeruta (57) ABSTRACT

A sequential illumination system for a visual display unit has a light source emitting a polychromatic light beam towards the visual display unit within a wavelength range having at least three primary colors, and a color wheel provided with at least three transmissive or reflective segments for transmitting the light beam along an optical path in such a way that they successively cut the direction of propagation of the beam. The colour segments are distributed on the wheel in such an order that the differences of energies perceived by the visual organ of a standard observer (visual stimuli), are as equivalent as possible during the intersegment transitions, when the segments pass along the optical path of the beam. The illumination system can be used for movie overhead projection devices.

10 Claims, 4 Drawing Sheets

U.S. PATENT DOCUMENTS

2002/0122160 A1* 9/2002 Kunzman .................... 353/31
2003/0227577 A1* 12/2003 Allen et al. ................. 348/742

FOREIGN PATENT DOCUMENTS

| JP | 2002-318564 | 10/2002 |
|----|-------------|---------|
| JP | 2003-248462 | 9/2003  |

OTHER PUBLICATIONS

Patent Abstracts of Japan, vol. 2003, No. 02, Feb. 5, 2003 & JP 2002-318564 (See Ref. Ad).

Search Report Dated May 4, 2005.

* cited by examiner

Optimum arrangement: BMCGR

Fig. 6

Optimum arrangement: $BC_1C_2GRM$

SEQUENTIAL COLOUR ILLUMINATION SYSTEM, METHOD FOR PRODUCING A COLOUR WHEEL FOR SAID SYSTEM AND A COLOUR SEGMENT DEVICE

This application claims the benefit, under 35 U.S.C. § 365 of International Application PCT/EP05/050617, filed 11 Feb. 2005, which was published in accordance with PCT Article 21(2) on 22 Sep. 2005 in French and which claims the benefit of French patent application No. 0450254, filed 12 Feb. 2004.

FIELD OF THE INVENTION.

The invention relates to a colour sequential illumination system applicable in particular in certain image projection and/or viewing systems. It in particular uses a device allowing the scrolling of transmissive or reflective coloured segments through the optical path of an illumination system, for example a wheel comprising coloured segments which move in the illumination beam of a spatial light modulator. The invention also relates to a method of design of the said colour wheels.

TECHNICAL BACKGROUND

Image projection and/or viewing systems commonly called projectors or rearprojectors according to whether projection is done on the front face of the screen for projectors, or whether projection is done on the rear face for rearprojectors, operate according to the same principle. An illumination system illuminates in a uniform manner one or more imagers comprising an array of pixels, for example of the LCOS "Liquid Crystal On Silicon", DMD "Digital Micro-mirror Device/Display", or HTPS "High Temperature Poly Silicon" transmissive liquid crystal type, disposed for example in rows and columns on a substrate forming an active matrix, in particular made of silicon. The light emanating from the illumination system is modulated after passage through the imager or imagers in the case of transmissive imagers or after reflection on the imager or imagers in the case of reflective imagers, for example LCOS or DMD. The thus modulated light is thereafter projected onto a screen through an optical device. To generate colour images, the imager or imagers is or are illuminated with one or more beams of coloured light, generally Red, Green and Blue.

Certain image projection and/or viewing systems comprise three imagers, each of the imagers being illuminated by a coloured light beam corresponding to one of the three primary colours. These image viewing systems with three imagers are complex, it is necessary to specifically recombine the three beams of coloured light which have passed through or have been reflected on the imagers so as to recompound only a single modulated light beam ready to be projected onto a screen. In addition to the number of imagers used, these image viewing systems require the use of cumbersome and expensive optical elements. There exist image projection and/ or viewing systems comprising two imagers, as for example the image projection system described in IBM patent U.S. Pat. No. 5,863,125. In this document, each imager is alternately illuminated by a coloured light beam, in such a way that the electronic addressing of the data for writing the pixels of a frame as well as the stabilization of the said pixels related to the response time of the liquid crystals, can be performed on the imager which is not illuminated. This period, of the order of a few milliseconds, during which an imager may not be illuminated, is called "dead time". The image projection system described in the IBM document has the advantage of managing this dead time, however, it remains complex and expensive by dint of the presence of the two imagers. Moreover imagers of the LCOS "Liquid Crystal On Silicon", or DMD "Digital Micro-mirror Device/Display" type for example exhibit less significant dead times than previously, DMD type imagers can indeed operate at high frequencies greater than four hundred Hertz for example.

For a few years now, image projection systems have been evolving towards a mono-imager device, or "mono-valve" as it is known, of transmissive or reflective type, that are less cumbersome and less expensive than image projection systems comprising several imagers.

To generate colour images, projection systems of this type sequentially display images of different colours on the screen, generally the three primary colours RGB (red, green and blue). These devices are named "Field Sequential colour displays". These image projection systems generally comprise illumination devices for illuminating the single imager by an alternately red, green and blue light through the use, for example, of colour wheels such as described in patent application EP 0749250. These colour wheels generally comprise a red segment, a green segment, and a blue segment, R, G, B that are transmissive (coloured filters) or reflective. The video data controlling the writing of the pixels of the imager are synchronized with the colour of illumination of the imager so as to form an image ensuring the best possible restitution. However, image projection and/or viewing systems with single imager of this type have certain disadvantages relative to systems with several imagers. For example, the imager must operate at high frequencies, generally three times the frequency of the images for a colour wheel with three primary colour segments, i.e. at least 150 to 180 Hz, and generally at n times the frequency of the images when using a colour wheel with n primary colour and/or compound colour segments. Moreover, given that a single colour is displayed at one and the same time, a significant share of the light flux emanating from the light source is lost since it is filtered sequentially.

Thus, to improve the luminosity of the projected images, certain colour wheels comprise a white segment as for example the device described by Texas Instrument in patent U.S. Pat. No. 5,233,385. This device makes it possible to display brighter images, to the detriment of the quality of the colours which will be desaturated (less vivid) because of the presence of a polychromatic light covering at the minimum a part of the visible range and of white aspect.

Another major drawback related to the sequential display of images of different colours on a screen is the perception by the viewer of the decomposition or separation of the colours into these RGB primary components when for example certain objects of the image move rapidly or during an abrupt movement of the head, a blinking of eyes, or any sudden arbitrary spatial variation of the retinal image of the observed scene, whatever the observation conditions. This phenomenon called "colour break up" or the "Rainbow effect", is manifested also for stationary images, for example when the eyes of the viewer rapidly scan the screen, when the eyes of the observer are subject to nystagmus or the phenomenon of micro-accommodation, or else for rapidly moving images with a stationary observer. One of the means for reducing this phenomenon of "colour break up" is to increase the frequency of sequential display/illumination of the imager. Certain colour wheels comprise six colour segments for example in the form of two coplanar subsets of three RGB coloured segments as described in the Texas Instrument American patent U.S. Pat. No. 5,448,314. The speed of rotation of the colour wheel being determined, this method makes it possible to double the frequency of colour sequential illumination on the imager whose addressing frequency must also be doubled. Nevertheless the "colour break up" is attenuated but still remains quite visible since the image frequency is well below the threshold defining the limit of perception of the phenomenon i.e. two thousand five hundred Hertz according to the minimum width of a colour artefact corresponding to an image pixel, and according to the visual acuity of the standard observer.

SUMMARY OF THE INVENTION

The invention proposes a solution with a view to solving this problem;

The invention therefore relates to an imager sequential illumination system comprising:
  a source emitting towards the imager a polychromatic light beam in the wavelength range comprising at least three primary colours,
  a device for scrolling coloured segments comprising at least three transmissive or reflective segments, the said scrolling device making it possible to scroll the said segments over the optical path of the said polychromatic light beam so that they successively cut the direction of propagation of the said beam in the case where the segments are transmissive, or so that they successively reflect the said beam in the case where the segments are reflective, the said segments being of different colours and each having a hue, a saturation, a transmissivity or a reflectivity, and a size that are suitable for obtaining a beam exhibiting a reference hue characterized by its colour temperature, when they scroll sequentially over the said optical path of the said beam.

According to the invention, the coloured segments are distributed over the said scrolling device in an order such that the differences of energies perceived by the visual system of a standard observer (visual stimuli), during the intersegment transitions, when the segments scroll through the said transmission zone, are the least variable possible. Preferably, the sum of the differences of perceived energies is a minimum.

For a colour wheel furnished with a determined number of segments each having a determined dimension and making it possible to obtain a determined global colour temperature, the distribution of the segments over the said scrolling device is such that the sum of the said differences of energies between successive segments, perceived by the visual system of a standard observer is the lowest possible.

Advantageously, a scrolling device comprises several segments of like colour so as to distribute the differences of excitation energies over several intersegment transitions.

Also, the scrolling device can comprise a different number of primary colour or recompounded colour segments so as to distribute the differences of excitation energies over several intersegment transitions.

Advantageously, the said device for scrolling coloured segments comprises a colour wheel comprising at least three transmissive or reflective segments, the said wheel being mounted on means of rotation so as to scroll the said segments over the optical path of the light beam.

The invention also relates to a method of design of a colour wheel for an imager colour sequential illumination system. The said wheel is devised to comprise at least three transmissive and/or reflective segments of different colours and each having a hue, a saturation, a transmissivity or a reflectivity, and a size that are suitable for obtaining a beam exhibiting a reference hue when they scroll sequentially through a zone of transmission of an illumination beam. There is provided a step of measuring the energies of excitation of the visual system that are induced by the various segments, corresponding to a level of perception of the said transmitted or reflected energy for each segment constituting the said colour wheel as a function of the sensitivity curve of the standard observer, and a step of distributing the coloured segments over the said colour wheel in an order such that the differences of intersegment excitation energies are the least variable possible.

For a colour wheel furnished with a determined number of segments each having a determined dimension or angular size and making it possible to obtain a determined global colour temperature, the distributing of the segments over the said wheel is carried out in such a way that the sum of the said differences of excitation energies perceived by the visual system of a standard observer (visual stimuli), during the intersegment transitions, when the segments scroll through the zone of transmission of the beam is the lowest possible.

The invention also relates to a device of coloured segments comprising a plurality of juxtaposed zones of different colours making it possible to provide, by illumination of the various zones, beams of different colours, characterized in that the said zones of different colours are arranged in an order such that when they are successively illuminated according to the said order, the differences of energies perceived by the visual system of a standard observer (visual stimuli), during the interzone transitions, when the illumination passes from one zone to the next zone, are the least variable possible.

Advantageously, the said zones of different colours are arranged in an order such that the sum of the said differences of excitation energies, perceived by the visual system of an observer during the various transitions between successive zones, is the lowest possible.

Advantageously, this device of coloured segments is a colour wheel.

LIST OF DRAWINGS

The various aspects and characteristics of the invention will appear more clearly in the description which will follow and in the appended figures which represent.

DETAILED DESCRIPTION OF THE INVENTION

Figures 1A, 1B:
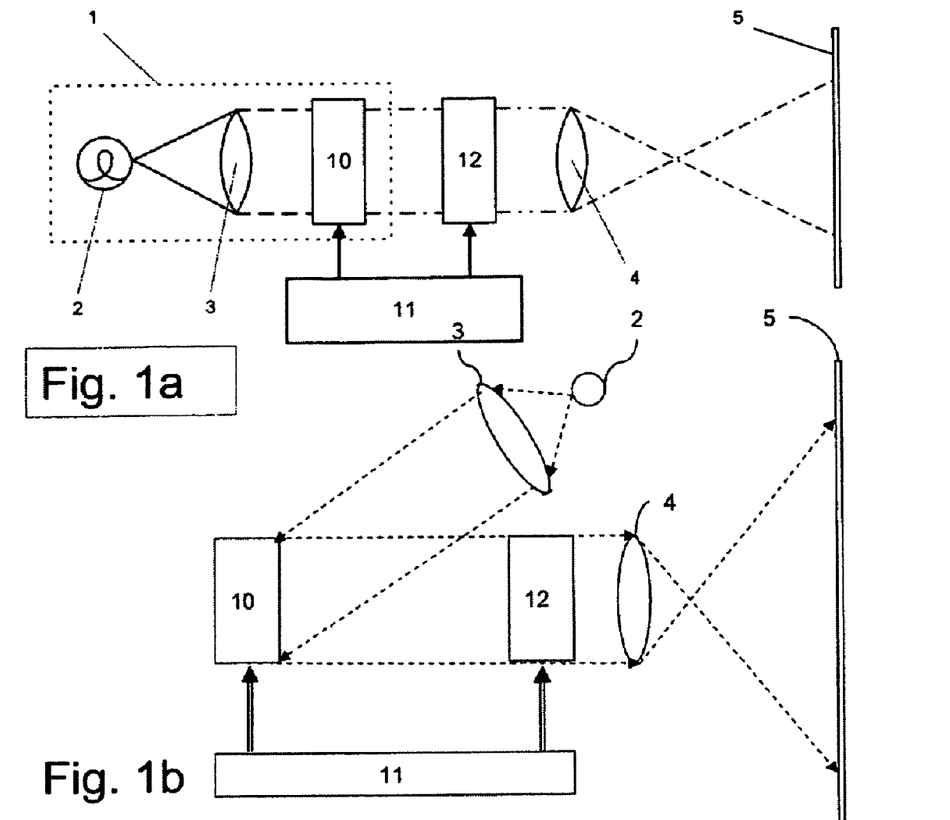
FIGS. 1a and 1b, example viewing systems to which the invention applies.

Referring to FIG. 1a, we shall first of all describe the general principle of operation of an image viewing and/or projection system of mono-imager or spatial light modulator type.

A projection system comprising only a single imager is represented diagrammatically in FIG. 1. The system comprises an illumination system 1 in particular comprising a light source 2 which sends the light to an illumination device 10 charged with sequentially illuminating the single imager 12 of a light beam coloured successively red, green and blue so as to obtain a colour image after these successive illuminations.

The light emanating from the illumination system 1 illuminates an imager 12 which operates either in transmission or in reflection. The example of the system of FIG. 1a represents an imager operating in transmission. This imager comprises an array of pixels control of which is managed by video data management means. The control of the pixels is associated in particular with synchronization means 11 for synchronizing the light emanating from the pixels illumination system with the video data originating from the said video data management means or inversely, to synchronize video data controlling the pixels of the imager 12 modulating the incident light, as a function of the received illumination colour.

After transmission, or reflection, at the level of the imager 12, the thus modulated light is projected onto a screen 5 via an optical device 4. The devices 3 and 4, as well as the light source 2 are known in themselves and will not be further described subsequently.

Figure 2A:
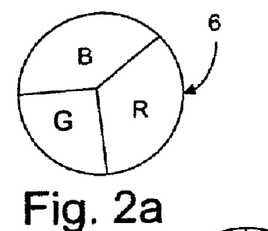
FIGS. 2a to 2d, example colour wheels for which the invention applies.
Figure 2B:
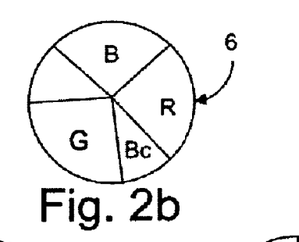

The illumination system 10 according to the invention comprises a device making it possible to sequentially scroll a defined number of coloured transmissive elements, for example a colour wheel 6. Colour wheel is understood to mean a disk mounted by its axis on means of rotation. Such a disk comprises, as represented for example in FIG. 2a, coloured sectors or segments 61, transmissive or otherwise, generally red R, green G and blue B colour filters, dichroic or otherwise, which, during the rotation of the wheel 6, successively cut the polychromatic light beam generally of white hue emitted by the light source 2. In this case, the light beam emitted by the light source 2 gives rise, after transmission or reflection on the wheel 6, according to whether the coloured segments (0.6) are transmissive or reflective, successively to at least, a beam of red colour light R, a beam of green colour light G, and a beam of blue colour light B. FIG. 2b represents a colour wheel with four segments; one segment coloured red, one green and one blue (RGB) and a segment of white hue W, known from the prior art.

Figure 2C:
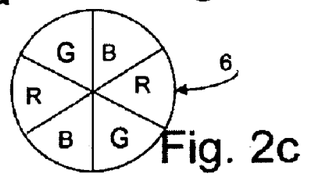

FIG. 2c exhibits a colour wheel with six segments coloured RGBRGB also known from the prior art.

Figure 2D:
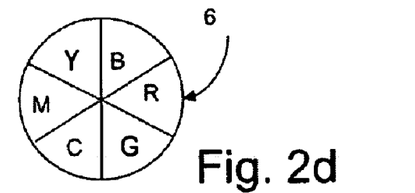

FIG. 2d exhibits a colour wheel with six segments BRGCMY also known from the prior art.

In the exemplary embodiment of FIG. 1a, the illumination system is spliced into the path of the light beam emitted by the light source 2. The colour wheel therefore operates in transmission and the colour filters operate in transmission, the red colour filter allowing through the light belonging to the red wavelength range, the green colour filter allowing through the light belonging to the green wavelength range and the blue colour filter allowing through the light belonging to the blue wavelength range.

However the filters of the colour wheel could operate by reflection. In this case one would have an arrangement of the optical system such as represented in FIG. 1b. The light source 2 illuminates the illumination system 10 which chiefly comprises a colour wheel whose segments selectively reflect red light, green light or blue light. When the colour wheel rotates, it sends back to the imager 12 successively a red light beam, a green light beam, a blue light beam.

In the description which will follow, we shall describe a system in which the segments of the colour wheel operate in transmission, but operation would be similar if the segments operated in reflection.

Hence we consider first of all an illumination system comprising a colour wheel constituted advantageously of several coloured segments of different hues, which segments, when the wheel is set in rotation, cut off sequentially the polychromatic light beam emitted by a light source so that the imager is sequentially illuminated according to a frequency determined by the number of segments making up the said colour wheel and its rotation speed.

Figure 3A:
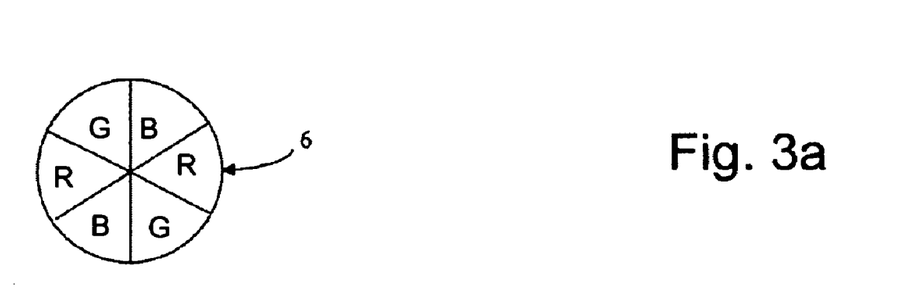
FIGS. 3a to 3c, an example nonoptimized colour wheel.

According to a first exemplary embodiment represented in FIG. 3a, the number of different colour segments of the colour wheel can be of six units; i.e. for example the primary colours Red, Green, blue distributed in two subsets RGB1 and RGB2 each of three RGB segments.

The angular size of each segment is determined by the colour temperature to be attained for the system; the said colour temperature having to be the most similar possible between the coexisting coplanar subsets if several coplanar subsets of segments constitute the colour wheel so as to avoid the phenomenon of flicker. For example, in FIG. 3a, the two subsets must possess angular segments such that the colour temperature of the system RGB1 is substantially equal to the colour temperature of the system RGB2 and equal to the colour temperature of the total system. This is achieved taking account of the limits of the isotemperature curves.

Each component filter of a colour segment is characterized by its passband, its transmission and its display time, the display time being dependent on the angular size over the colour wheels and on the speed of rotation of the colour wheel. Thus, the contribution to the transmission of the luminous energy of each colour filter is specific. Each of the colours coming into play in the construction of an image therefore possesses a transmitted energy level specific to each colour filter employed, and generates a different excitation of the visual system according to the said respective passbands of these filters, as well as according to the spectral sensitivity of the standard observer.

For a colour wheel comprising two coplanar subsets with red, green and blue colour segments, each subset having the same dimension such as the colour wheel of FIG. 3a, the table below gives for each filter examples of values of energies emitted by each of them and examples of values of corresponding energies perceived by the visual system of a standard observer, also called "visual stimuli".

| Colours | Energy emitted in Watts | Visual stimuli S.I. | Size of the segments in degrees |
| --- | --- | --- | --- |
| Red | 1.5 | 0.3 | 60 |
| Green | 2.2 | 1.8 | 60 |
| Blue | 1.5 | 0.14 | 60 |
| Red | 1.5 | 0.3 | 60 |
| Green | 2.2 | 1.8 | 60 |
| Blue | 1.5 | 0.14 | 60 |

The transmissivity of each coloured segment or filter used, combined with the sensitivity curve $V(\lambda)$ of the visual system of the standard observer and with the light flux emanating from the source, leads to very large differences in the energy perceived by the said visual system according to the red, green or blue hue which is transmitted. As illustrated in FIG. 3c, the visual system of the observer is then subjected to a stimuli involving a perceptive impression of a very large discontinuity; thereby contributing to the perception of the colour artefacts known as "colour break up".

When observing the table above, it is apparent that the differences of visual stimuli $\Delta S$ when passing from red illumination to green illumination is $\Delta S(R/G)=1.5$, then when passing from green illumination to blue illumination $\Delta S(G/B)=1.66$, and when passing from blue illumination to red illumination $\Delta S(B/R)=0.16$. This table therefore highlights this discontinuity of differences of energy of visual stimuli when passing from one coloured segment to another.

Figure 3B:
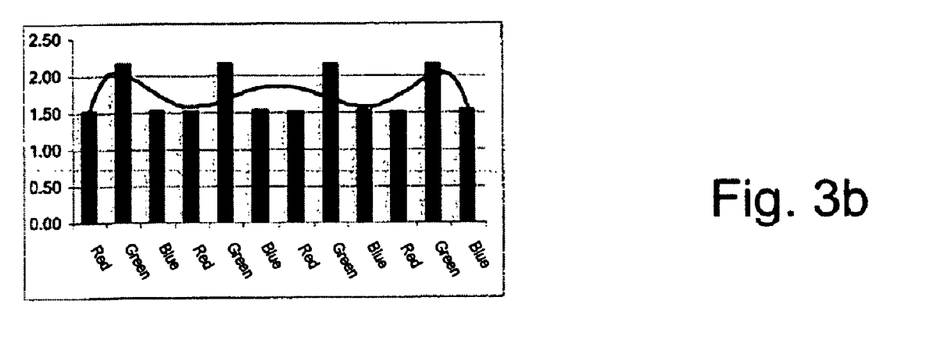
Figure 3C:
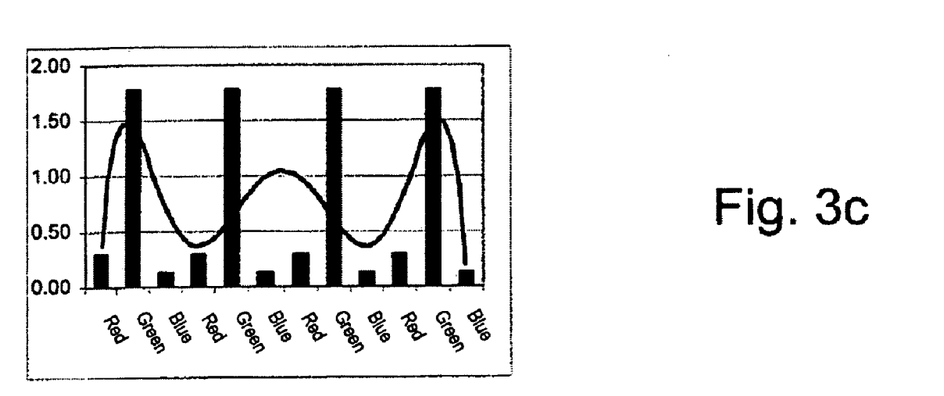

The graphics of FIGS. 3b and 3c also illustrate these energy variations. FIG. 3b represents the amounts of energy transmitted by the various coloured sectors of the colour wheel of FIG. 3a; The graphic of FIG. 3c illustrates the corresponding energies perceived by a normal eye (visual stimuli). We see in this graphic that the energy variations perceived by the eye are significant. These differences of energies are one of the causes giving rise to the perception of "break-up" described previously To reduce this "colour break-up", the invention envisages colour wheels exhibiting energy differences $\Delta E$ attenuated as far as possible in such a way that the excitation of the eye is as continuous as possible.

According to the invention the segments of a colour wheel are distributed over this wheel in such a way that the sum of the differences of energies perceived by an observer in the course of a revolution of the colour wheel is a minimum.

The method of separation by progressive evaluation (SEP) makes it possible to find the best arrangement on the basis of the general table of the energy deviations perceived for the set of all possible transitions between filters.

Figure 4A:
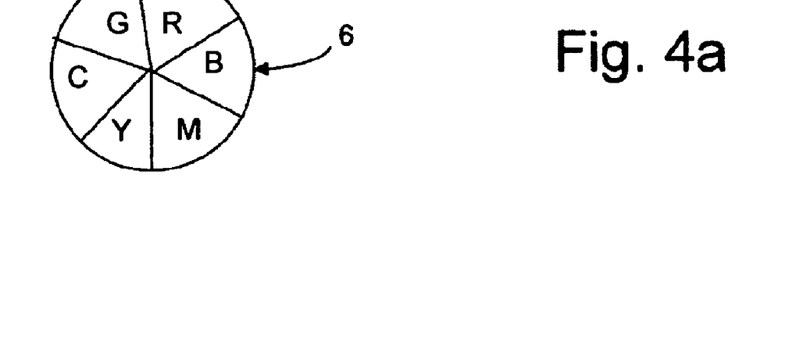
FIGS. 4a to 4c, an example colour wheel optimized according to the invention.
Figure 4B:
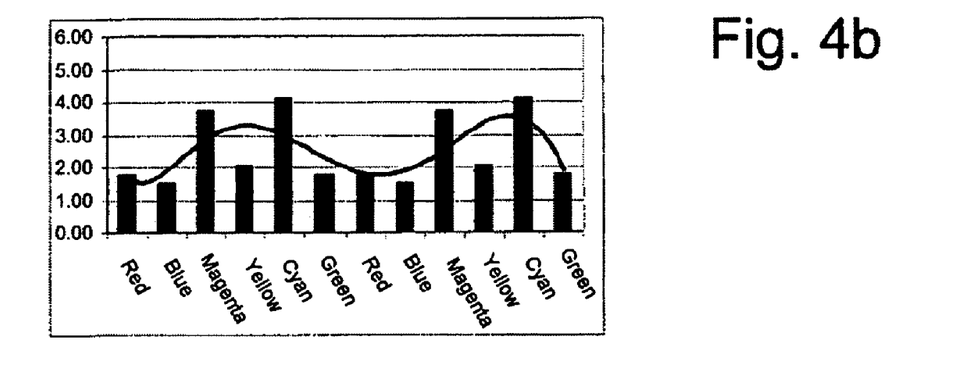
Figure 4C:
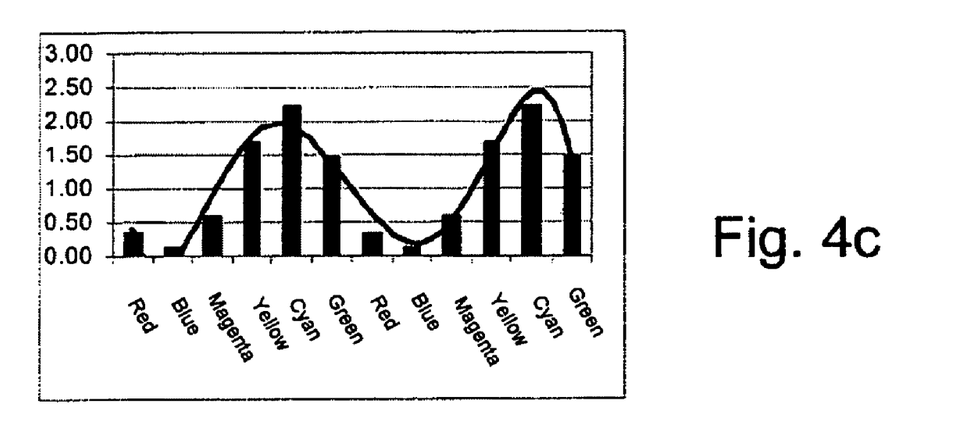

An example of a colour wheel comprising 6 segments RGBCMY for a colour temperature of 7590° K is provided by FIGS. 4a to 4c. The table below gives for each segment of this colour wheel, the values of the energies emitted, the values of the energy perceived or "visual stimuli" and the dimensions of the segments.

| Colours | Energy Emitted in Watts | Visual stimuli S.I. | Size of the segments in degrees |
|---|---|---|---|
| Red | 1.8 | 0.35 | 70 |
| Blue | 1.5 | 0.14 | 60 |
| Magenta | 3.7 | 0.6 | 70 |
| Yellow | 2.0 | 1.7 | 40 |
| Cyan | 4.0 | 2.2 | 70 |
| Green | 1.8 | 1.5 | 50 |

The inter-segment energy differences ($\Delta E$) make it possible to define the optimal arrangement ensuring better continuity of the stimuli intra ("sub-frame") and inter image ("frame"). The optimal arrangement makes it possible to minimize the energy differences perceived ($\Delta S$) from 20% for a standard RGBRGB colour wheel, and up to 50% for an RGBCMY colour wheel; thereby ensuring a significant reduction in "colour break-up" perception verified experimentally.

The table above makes it possible to calculate the differences of visual stimuli when passing from one segment to the next. For n segments used, there are n! possible transitions. The construction of a wheel then requires n transitions, it being possible for each colour to be represented in only two different transitions.

The use of compound colours; cyan, yellow, magenta, makes it possible to attenuate the differences of energies with respect to the system of FIGS. 3a to 3c comprising solely red, green and blue primary colours. Moreover, the optimized arrangement with the method of separation by progressive evaluation of the possible transitions, also makes it possible to minimize the deviations between visual stimuli, hence to minimize "colour break up".

In the exemplary embodiment 4a to 4c, after having chosen the types of coloured segments used, and after having determined the dimensions of the segments so as to obtain a determined colour temperature, the measurement of the visual stimuli induced by each segment has allowed the calculation of the arrangement of the segments which provides a minimum sum of transitions.

Moreover, to decrease the differences of energies between segments or to distribute them, provision is also made to divide a segment into two or more parts having regard to the fact that the dimension of the segments must be compatible with the imager control frequency.

Moreover, in the case where the colour wheel comprises several subsets of segments as is the case in FIG. 3a, the subsets are chosen so that their colour temperatures are substantially equivalent so as to avoid any phenomenon of flicker.

Figure 5A:
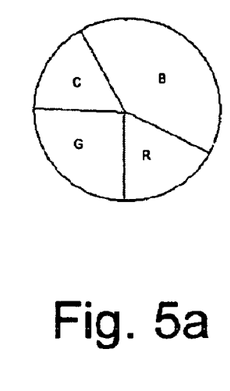
FIGS. 5a to 5b, 6, 7 and 8 example colour wheels according to the invention.
Figure 5B:
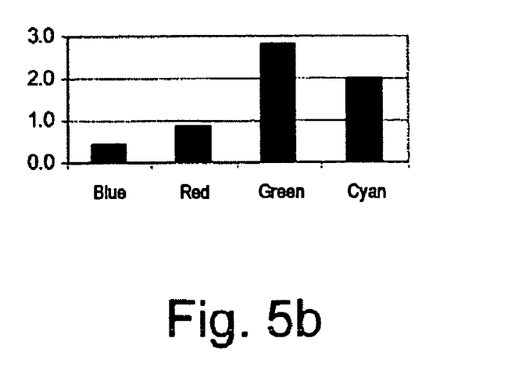

FIGS. 5a to 5 provide an exemplary embodiment of the invention comprising four segments coloured red, green, blue and cyan making it possible to obtain a colour temperature of 10500° K. These segments are arranged as indicated in FIG. 5a in the order blue/red/green/cyan.

Figure 6:
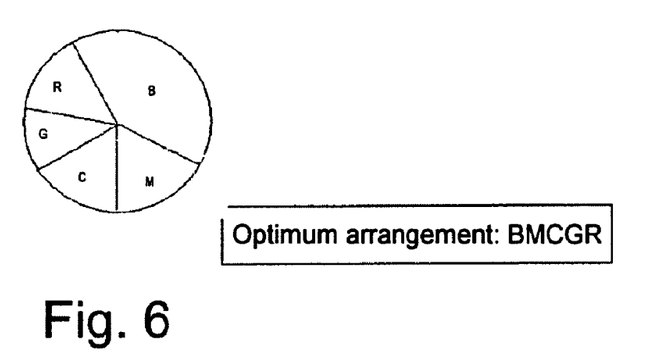

FIG. 6 provides an exemplary embodiment of the invention comprising five segments coloured red, green, blue, cyan and magenta making it possible to obtain a colour temperature of 13000° K. These segments are arranged as indicated in FIG. 6 in the order blue/magenta/cyan/green/red.

Figure 7:
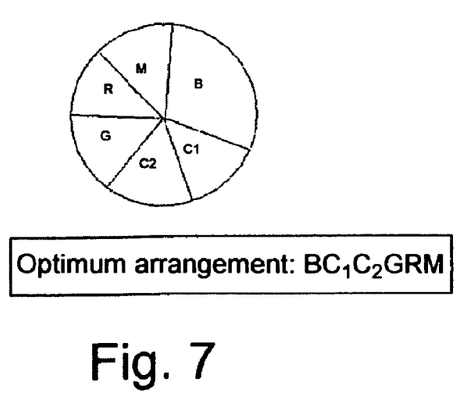

FIG. 7 provides an exemplary embodiment of the invention comprising six segments coloured red, green, blue, two segments cyan, and magenta making it possible to obtain a colour temperature of 11500° K. These segments are arranged as indicated in FIG. 7 in the order blue/cyan1/cyan2/green/red/magenta.

To reduce the phenomena of "colour break up", the invention therefore envisages constructing colour wheels with colour segments whose sizes comply with:
the reference white that one wants to attain (The colour temperature of the display system)
the maximum number of segments that can be supported by the imager used; i.e. the minimum time necessary for addressing the said imager.
And in such a way that the perceived energy is averaged; that is to say there is the lowest possible average deviation in transmitted energy between 2 successive segments.

For example, with a wheel with 3 segments: R,G,B for a colour temperature of 8000° K:
the perceived energy for the blue segment (125°) is 0.293 SI.
the perceived energy for the green segment (80°) is 2.368 SI.
The perceived energy for the red segment (155°) is 0.769 SI.

These energies are very different (Mean deviation from the mean=0.817 SI). This is why, it is in this case preferable to increase the number of segments of the wheel by separating into several segments that or those which are much greater than the average: that is to say in the present case, separate the green segment into 2 parts of 40° and 1.18 SI each (see FIG. 8).

Figure 8:
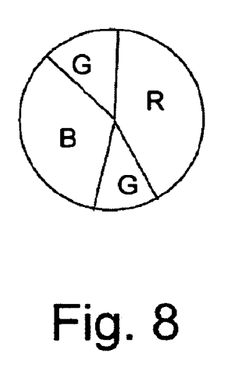

We thus obtain a wheel with 4 segments RGBG with minimized deviations of perceived energy (Mean deviation from the mean=0.335 SI i.e. a ratio greater than 2 relative to the initial RGB wheel).

For wheels initially comprising a number greater than 3 of segments, it is possible to proceed in the same manner, except for the difference that the order of presentation of the segments (their arrangement) is not determined randomly but according to the method described previously.

In this case, the arrangement must minimize the deviations of visual excitation introduced by the inter-segment transitions according to the mathematical method of Separation by Progressive Evaluation.

For example: a wheel with 6 segments: R, G, B, C, M, Y for a colour temperature of 7590° K, used with an LCOS imager (Frame rate of 360 Hz maximum i.e. 6 different colour segments at the maximum since the addressing time of the said imager permits segments of a minimum size of 40° at the rotation speed used and since the colour temperature condition must necessarily be fulfilled):

The perceived energy for the blue segment (60°) is 0.141 SI.

The perceived energy for the green segment (40°) is 1.184 SI.

The perceived energy for the red segment (70°) is 0.347 SI.

The perceived energy for the Cyan segment (70°) is 2.225 SI.

The perceived energy for the Magenta segment (70°) is 0.6 SI.

The perceived energy for the Yellow segment (40°) is 1.677 SI.

For such a colour wheel, the colour temperature chosen imposes an angular size for each segment, hence the energy transmitted. The more these energies differ from one another, the more there exist significant differences of levels between the transitions from one colour to another; this being a factor of the perception of "colour break-up". As has been described previously, the segments will be arranged in an order such that the total sum of the energy transitions between segments is minimized. The table below presents two colour wheels composed of the same segments, but the right part of the table gives an arrangement which minimizes the energy transitions and therefore which reduces the "colour break up" while the left part describes an arbitrary arrangement.

| RGBCMY Colour wheel | | | Optimized RBMYCG colour wheel | | |
| --- | --- | --- | --- | --- | --- |
| Colours | NRJ perceived | Transitions | Colours | NRJ perceived | Transitions |
| Red | 0.347 | 1.1327 | Red | 0.347 | 0.2068 |
| Green | 1.48 | 1.3395 | Blue | 0.1405 | 0.4597 |
| Blue | 0.1405 | 2.0849 | Magenta | 0.6002 | 1.00771 |
| Cyan | 2.2254 | 1.6252 | Yellow | 1.6772 | 0.5482 |
| Magenta | 0.6002 | 1.0771 | Cyan | 2.2254 | 0.7454 |
| Yellow | 1.6772 | 1.3299 | Green | 1.48 | 1.1327 |
| | Total | 8.5892 | | Total | 4.1699 |
| | Mean | 1.43154 | | Mean | 0.69498 |

In the description above, the device making it possible to provide a coloured beam is a colour wheel. The invention would be applicable to any other device making it possible to scroll coloured elements so as to provide beams of various colours. For example, such a device could also be a cylinder whose peripheral surface comprises juxtaposed coloured elements.

Moreover, it has been validated experimentally that the specific arrangement of the coloured filters or segment of the original wheel RGBCMY according to the "SEP" method described previously led to an RBMYCG optimized wheel decreasing the perception of "Colour Break up".

The invention claimed is:

1. Imager sequential illumination system comprising:
a source emitting towards the imager a polychromatic light beam in a fixed wavelength range comprising at least three primary colors,
a color wheel for scrolling colored segments comprising at least three transmissive or reflective fixed segments, the color wheel making it possible to scroll the fixed segments over the optical path of the polychromatic light beam so that they successively transmit and filter the polychromatic light beam in the case where the fixed segments are transmissive, or so that they successively reflect and filter the polychromatic light beam in the case where the fixed segments are reflective, the fixed segments being of different colors, and each fixed segment having a hue, a saturation, a transmissivity or a reflectivity, and a size that is suitable for obtaining a colored beam exhibiting a primary color with a reference hue when this fixed segment is scrolled over the optical path of the polychromatic light beam,
wherein the fixed colored segments are distributed in the color wheel in an order such that differences of energies between any two successive colored beams that follow one another, when the fixed segments of the colored wheel scroll over the optical path of the polychromatic light beam, are the least variable possible compared to other possible orders, the energies being defined as perceived by the visual system of a standard observer.

2. The illumination system according to claim 1, wherein the fixed colored segments are distributed in an order such that the sum of the differences of energies between any two successive colored beams is minimized.

3. The illumination system according to claim 2, wherein the color wheel comprises several fixed segments of like color so as to reduce the mean differences of excitation energies by distributing them over several intersegment transitions.

4. The illumination system according to claim 3, wherein the color wheel comprises a different number of fixed segments of primary or recompounded colors so as to reduce the mean differences of excitation energies by distributing them over several intersegment transitions.

5. The illumination system according to claim 1, wherein the color wheel is mounted on means of rotation so as to scroll the fixed segments over the optical path of the polychromatic light beam.

6. Method of design of a color wheel for an imager color sequential illumination system, comprising
the step of providing the color wheel having at least three transmissive or reflective fixed segments that are suitable for obtaining successive beams of different colors when the fixed segments scroll sequentially through a zone of transmission of an illumintation beam having a fixed wavelength distribution, the fixed segments being of different or identical colors, each segment having a hue, a saturation, a transmissivity or a reflectivity, and a size that is suitable for obtaining a colored beam exhibiting a reference hue when it crosses the zone of transmission of the illumination beam,
a step of measuring excitation energies of each colored beam induced by various segments in a visual system of an observer, and
a step of distributing the fixed colored segments over the color wheel in an order such that differences of excitation energies between any two successive colored beams that follow one another, when the fixed segments scroll in the order through the transmission zone, are the least variable possible.

7. The method according to claim 6, wherein for a color wheel furnished wit a determined number of fixed segments each having a determined dimension and making it possible to obtain a determined global color temperature, the distributing of the fixed segments over the wheel is carried out in such a way that the sum of the differences of energies between any two successive colored beams is the lowest possible.

8. Device of fixed colored segments comprising a plurality of juxtaposed zones of different colors making it possible to provide beams of different colors, by an illumination beam having a fixed wavelength distribution, wherein the fixed zones of different colors are arranged in an order such that when they are successively illuminated according to the order, differences of energies between any two successive colored beams that follow one another, when the illumination passes from one fixed zone to another next fixed zone in said order, are the least variable possible, the energies being defined as perceived by the visual system of a standard observer.

9. The device of colored segments according to claim 8, wherein the zones of different colors are ranged in an order such that a sum of the differences of energies between any two successive colored beams is the lowest possible.

10. The device of colored segments according to claim 8, wherein it comprises a color wheel.

* * * * *